(12) United States Patent
Fitton et al.

(10) Patent No.: US 8,398,180 B2
(45) Date of Patent: Mar. 19, 2013

(54) METHOD OF BRAKING A VEHICLE

(75) Inventors: Gregory Peter Fitton, Stoke-on-Trent (GB); Andrew Robert Williams, Marston Montgomery (GB)

(73) Assignee: JCB Landpower Limited, Uttoxeter (GB)

( * ) Notice: Subject to any disclaimer, the term of this patent is extended or adjusted under 35 U.S.C. 154(b) by 877 days.

(21) Appl. No.: 11/556,516

(22) Filed: Nov. 3, 2006

(65) Prior Publication Data

US 2007/0138864 A1 Jun. 21, 2007

(30) Foreign Application Priority Data

Dec. 21, 2005 (GB) .................................. 0525910.6

(51) Int. Cl.
*B60T 8/56* (2006.01)
*B60T 13/74* (2006.01)
(52) U.S. Cl. ............. 303/139; 303/157; 303/20; 701/82
(58) Field of Classification Search .................... 303/20, 303/142, 145, 157, 164, 139, 9.62; 701/71, 701/82, 87
See application file for complete search history.

(56) References Cited

U.S. PATENT DOCUMENTS

| 3,465,520 | A | * | 9/1969 | Hann ............................... 60/443 |
| 5,013,094 | A | | 5/1991 | Nishii et al. |
| 5,251,970 | A | | 10/1993 | Braschel et al. |
| 5,273,349 | A | * | 12/1993 | Kidston ......................... 303/162 |
| 5,281,009 | A | * | 1/1994 | Kidston et al. ................ 303/162 |
| 5,301,130 | A | * | 4/1994 | Alcone et al. ................. 702/141 |
| 5,308,153 | A | * | 5/1994 | Kidston et al. ................ 303/162 |
| 5,495,925 | A | * | 3/1996 | Enk ............................... 192/3.63 |
| 5,609,399 | A | | 3/1997 | Feigel et al. |
| 5,676,111 | A | | 10/1997 | Zhang |
| 5,707,317 | A | * | 1/1998 | Tabata et al. .................. 477/109 |
| 5,713,640 | A | | 2/1998 | Feigel et al. |
| 5,759,131 | A | * | 6/1998 | Kosik et al. ..................... 477/84 |
| 6,161,903 | A | | 12/2000 | Dieringer |
| 6,195,995 | B1 | | 3/2001 | Bartsch |
| 6,244,393 | B1 | | 6/2001 | Weidenweber et al. |
| 6,937,932 | B2 | | 8/2005 | Sauter |
| 2001/0029419 | A1 | * | 10/2001 | Matsumoto et al. ............ 701/80 |

(Continued)

FOREIGN PATENT DOCUMENTS

| EP | 0 317 182 | 5/1989 |
| EP | 1 550 594 | 7/2005 |

(Continued)

OTHER PUBLICATIONS

Machine Translation for JP-2005161897.*

*Primary Examiner* — Melody Burch
(74) *Attorney, Agent, or Firm* — Lathrop & Gage LLP (57) ABSTRACT

A method of braking a vehicle which includes ground engaging wheels, and a braking system with ABS capability and including an operator actuated brake control, the ABS becoming operative in response to the operator actuating the brake control, and upon the braking system sensing the slippage or impending slippage of at least one of the ground wheels relative to the ground, to vary the braking force applied to the at least one of the wheels between, in alternative periods, an applied state in which the braking force is applied, and a released state in which the braking force is released, and characterised in that the method includes applying torque to assist acceleration of the wheel at least during periods in which the braking force is released by the ABS.

20 Claims, 3 Drawing Sheets

U.S. PATENT DOCUMENTS

| | | |
|---|---|---|
| 2003/0220171 A1 | 11/2003 | Sauter |
| 2005/0140206 A1 | 6/2005 | Sturgess |
| 2006/0009897 A1 * | 1/2006 | Schick et al. .................. 701/50 |
| 2007/0138864 A1 | 6/2007 | Fitton et al. |

FOREIGN PATENT DOCUMENTS

| | | |
|---|---|---|
| EP | 1 258 406 | 12/2006 |
| JP | 62231860 | 10/1987 |
| JP | 63013850 | 1/1988 |
| JP | 2005161897 A * | 6/2005 |

* cited by examiner

METHOD OF BRAKING A VEHICLE

CROSS-REFERENCE TO RELATED APPLICATIONS

This patent application claims the benefit of priority from United Kingdom Patent Application No. 0525910.6, filed on Dec. 21, 2005.

BACKGROUND TO THE OF INVENTION

This invention relates to a method of braking a vehicle in which a braking force is applied to ground wheels.

More particularly but not exclusively the invention relates to a method of braking large wheels on vehicles, for examples, a tractor or loading and/or excavating machine. By "wheels" we include the wheel hub and tyre mounted on the hub.

Such large wheel vehicles are being designed which are capable of high speed travel e.g. at speeds above 20 mph, on public roads. Accordingly the braking systems of such vehicles are required to comply with standards which apply to heavy road vehicles such as trucks. More particularly there is a requirement for the braking systems of such vehicles to have an ABS capability.

ABS becomes operative in response to an operator actuating a brake control, and upon the braking system sensing the slippage or impending slippage of at least one of the ground wheels relative to the ground. The ABS varies the braking force applied to at least one of the wheels between, in alternative periods, an applied state in which the braking force is applied, and a released state in which the braking force is released. The lengths of the applied state and released state periods and the magnitude of the braking force applied during the applied state periods, are determined by an algorithm which determines a notional deceleration of the vehicle and constantly monitors the speed of the at least one wheel to test the validity of the determined notional deceleration.

Thus for the ABS to operate optimally, it is essential that during the periods in which the braking force is released, the wheel accelerates due to its frictional contact with the ground, back towards a speed at which its angular velocity is close to the vehicle speed relative to the ground.

In the case of vehicles having heavy wheels, for example large tractor wheels with an outside diameter 2.0 meters or more and perhaps an axial length of 0.6 meter or more, such wheels will inherently have large inertia. In the case of vehicles such as dumpers, the rolling circumference of a wheel could be about 6 meters.

It has been found that during the periods in which the braking force is released, such wheels can fail to accelerate to anything like a speed at which their angular velocity is close to the vehicle speed due to their inertia. The problem is aggravated where there is a low coefficient of friction between the ground and the wheel, e.g. where the ground is icy, such that the wheels may slip relative to the ground during periods in which the braking force is released.

The effect on the operation of the ABS is that in monitoring the speed of a wheel during the periods in which the braking force is released, the ABS could make an incorrect assumption about the vehicle speed relative to the ground, based on its monitoring of the wheel speed to test the validity of the determined notional vehicle deceleration. More particularly, the ABS could perceive that the vehicle is slowing down at a rate faster than actually it is, and as braking progresses the error will increase. Thus, as indicated by the graph shown in FIG. 1, there is the possibility of the ABS being misled into determining that the vehicle speed has been arrested, when in fact the vehicle is skidding along the ground, e.g. a road surface, with one or more locked wheels.

Figure 1:
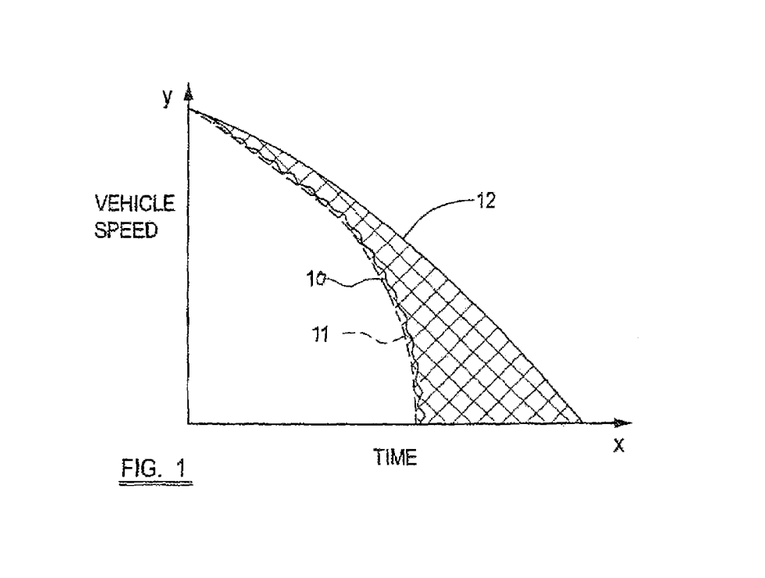
FIG. 1 is a graph plotting a perceived vehicle speed determined by an ABS against actual vehicle speed.

In FIG. 1, the graph plots vehicle speed along the y-axis against time along the x-axis. The irregular curve indicated at 10 and the simplified line at 11, is a plot of the notional vehicle speed, or a reference, determined by the ABS, e.g. by sensing the speed of the two front wheels of the vehicle, and determining the average. This is a standard function of an ABS achieved in different ways.

The line 10 is indicative of a rate of deceleration of the vehicle the ABS perceives it is achieving, by applying the variable braking force according to an ABS algorithm. The curve indicated at 12 plots the actual vehicle speed relative to the ground as may be determined by an external sensing system. The shaded area of the graph between the two plots 11, 12 represents the error due to the inertia of the wheels, and the distance along the x-axis between where the two plots 11, 12 cross the x-axis indicates a period during which the wheel will be unwantedly and dangerously locked by the ABS.

Thus vehicles with high inertia wheels present a particular problem where it is a requirement to provide a braking system with ABS capability.

DESCRIPTION OF THE PRIOR ART

It is known for vehicles such as automobiles, particularly but not exclusively automobiles which have automatic transmissions, to provide so called "drag torque control". In the event that the engine speed decreases rapidly, by for example a driver taking his foot off the accelerator pedal, particularly where the road speed is large and the coefficient of friction between the road and the wheel is low, there is a risk that the wheels will be locked up by the transmission, possibly leading to vehicle instability. Drag torque control operates by preventing the engine speed from reducing rapidly in order to avoid the possibility of wheels becoming locked by the transmission. The rate of engine speed reduction can be arranged to provide engine braking to the wheels, without permitting the wheels to lock up.

SUMMARY OF THE INVENTION

According to one aspect of the present invention we provide a method of braking a vehicle which includes ground engaging wheels, and a braking system with ABS capability and including an operator actuated brake control, the ABS becoming operative in response to the operator actuating the brake control, and upon the braking system sensing the slippage or impending slippage of at least one of the ground wheels relative to the ground, to vary the braking force applied to the at least one of the wheels between, in alternative periods, an applied state in which the braking force is applied, and a released state in which the braking force is released, and characterised in that the method includes applying torque to assist acceleration of the at least one wheel at least during periods in which the braking force is released by the ABS.

By virtue of the present invention, the inertia of the wheel, which may otherwise prevent the wheel being accelerated to bring its angular velocity close to the vehicle speed relative to the ground during periods in which the braking force is released by the ABS, is compensated for by the application of torque at least during those periods. Thus the risk of the ABS incorrectly determining the vehicle speed relative to the ground from its monitorings of wheel speed, is minimised, as the wheel will be accelerated by the applied torque to bring its angular velocity closer to the actual vehicle speed, and so the ABS will operate more effectively.

The torque which is applied to the at least one wheel to accelerate the wheel may be applied constantly during ABS braking, but may, where suitable control can be achieved, be only applied during periods when the braking force is released. In each case, the applied torque should not provide any significant opposition to the braking force when applied.

Preferably the torque which is applied is derived from a prime mover, such as an engine, which in normal use, acts, e.g. through a transmission, to drive the ground engaging wheels to provide the vehicle with forward or reverse motion. Thus the method may include, at least during those periods when the braking force is released and torque is applied to the at least one wheel to accelerate the wheel, maintaining a minimum engine speed so that torque is available for application to the at least one wheel to accelerate the wheel, as required. Practically, the engine speed may also be maintained during the alternative periods when the braking force is applied, but during those periods, the torque to accelerate the wheel is preferably not applied to the wheel.

Thus the method may include providing a signal to an engine controller during braking, at least when the ABS is operated and it is desired to provide torque to the wheel, to maintain the engine speed at a minimum speed. This may involve not only preventing the engine speed falling below the minimum speed, but accelerating the engine speed if necessary up to a minimum speed if required.

The method of the present invention may be applied not only to tractors, excavating/loading/shovelling and the like machines, but may be applied to any wheeled vehicle where it is desired to provide a braking system with ABS functionality, where the inertia of the wheels may potentially introduce errors into the ABS operation.

However the invention has been developed specifically for vehicles which are tractors and working machines, in which case the vehicle may have a CVT to transmit power from the engine or other prime mover, to drive wheels of the vehicle.

It will be appreciated that in a typical arrangement, when an operator driving a vehicle with a CVT in automatic mode, removes his foot from a foot operated control pedal, as the engine speed reduces in response, the CVT will reduce the transmission ratio between the engine and the wheels.

Thus in performing the method of the present invention, during the periods in which the braking force is released by the ABS and torque is applied to accelerate the wheel, a signal may be sent to a CVT controller instead of or preferably in addition to a signal being sent to the engine controller, to require the CVT to select a transmission ratio appropriate for applying the required torque to the wheel during the periods in which the braking force is released.

In the event that the transmission ratio is manually set, rather than automatically adjusted in response to an operator removing his foot from a foot operated engine speed control pedal, the method may include overriding such manual transmission ratio setting.

It will be appreciated that the optimum durations of the periods in which the braking force is applied and released by the ABS when the ABS is operated, will depend on vehicle speed. For vehicles with lower inertia wheels, such as automobiles, the ABS may need to apply and release the braking force several times each second. For a tractor and the like vehicle, the ABS may only be required to apply and release the braking force say, once per second.

Accordingly the engine speed controller and/or CVT controller and associated mechanical systems, must be able to respond when the ABS is operative, to apply the torque to the at least one wheel to accelerate the wheel to bring its angular velocity close to the vehicle speed relative to the road, and not to apply at least high driving torque during the periods when the braking force is being applied.

The CVT may be controllable to reduce the transmission ratio to or towards zero during the periods while the braking force is applied, for example through hydrostatic pressure reduction where the CVT variator is a hydraulic motor, or the transmission may isolate the prime mover from the wheel e.g. by disengagement of a clutch.

Where the invention is applied to a vehicle having an alternative kind of transmission, for example a manual transmission including a mechanical clutch, or a power-shift, automatic or automated-manual transmission, the method may include controlling the engine and/or transmission to provide a drive line for torque from the prime mover for application to the wheel at least in periods when the braking force is released by the ABS.

It will be appreciated that it will only be a requirement to perform the method of the invention when imminent wheel slip is sensed typically in circumstances where the coefficient of friction between the wheel and the ground, is too low to overcome the inertia of the heavy wheel to allow the wheel to accelerate sufficiently during those periods when the braking force is released. Thus the method of the invention may include determining any discrepancy between sensed wheel angular velocity and the vehicle speed determined by the ABS, and applying torque to the wheel at least during periods in which the braking force is released, where any discrepancy is determined to be sufficiently great to indicate that the wheel is not accelerating to bring its angular velocity sufficiently towards the vehicle speed during those periods.

Such an error may be determined by a torque controller which may analyse the actual wheel speed sensed, and compares it to a reference signal provided by the ABS which is indicative of vehicle deceleration determined by the ABS. If desired, there may be an auxiliary sensor such as an accelerometer to provide an input to the torque controller indicative of vehicle speed relative to the ground, independent of any wheel speed sensor, thus to enable the torque controller more accurately to determine any error between the vehicle speed determined by the ABS and actual vehicle speed relative to the ground.

According to a second aspect of the invention we provide a vehicle which includes ground engaging wheels, and a braking system with ABS capability and including an operator actuated brake control, the ABS being operative upon the braking system sensing the slippage or impending slippage of at least one of the ground wheels relative to the ground, to vary the braking force applied to the at least one of the wheels between, in alternative periods, an applied state in which the braking force is applied, and a released state in which the braking force is released, and characterised in that the vehicle includes a torque controller which is operative to apply torque to assist acceleration of the wheel at least during periods in which the braking force is released by the ABS.

The vehicle of the second aspect of the invention may have any of the features of a vehicle on which the method of the first aspect of the invention may be performed.

BRIEF DESCRIPTION OF THE DRAWINGS

Embodiments of the invention will now be described with reference to the accompanying drawings in which.

DESCRIPTION OF THE PREFERRED EMBODIMENTS

Figure 2:
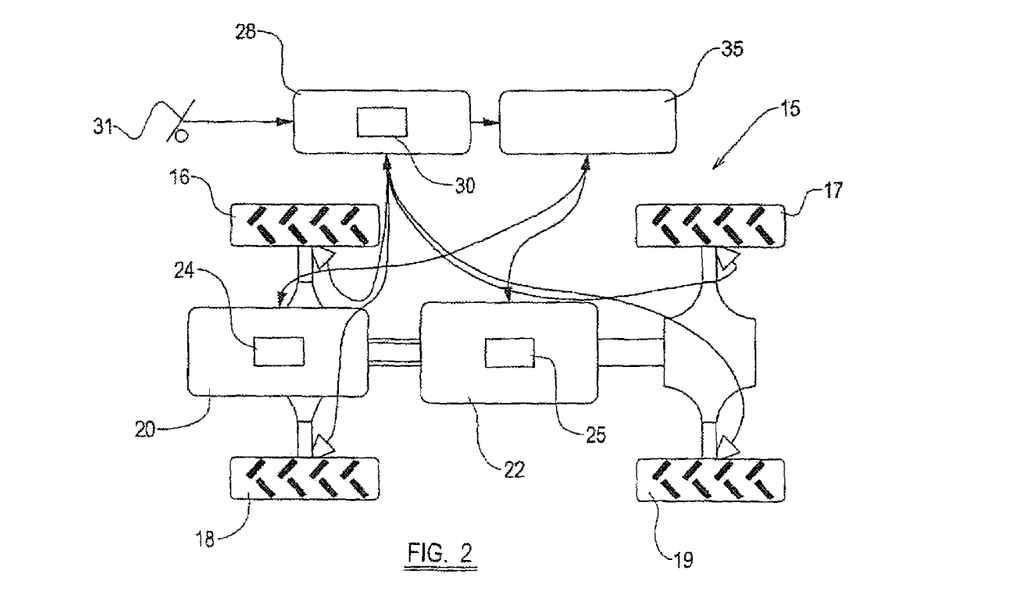
FIG. 2 is a diagrammatic illustration of a vehicle to which the present invention may be applied.

Referring to FIG. 2, a vehicle 15 includes in this example, four ground wheels 16-19, each of which are drivable from a prime mover 20, which in this example is a conventional engine, via a transmission 22.

The engine 20 is controlled by an engine controller (such as is known as an engine management system) 24, whilst the transmission 22, in this case a CVT transmission 22, is controlled by a transmission controller 25.

Each of the wheels 16-19 are braked wheels, there being a braking system 28 with ABS capability, with an ABS controller 30, and in this example a mechanical brake control namely a foot pedal 31. The braking system 28 could be an electrical braking system (EBS) if desired with a non-mechanical brake control, or may have electro-mechanical control, and where a mechanical brake control 31, this could, if desired, be a hand operated control.

In accordance with the present invention, the vehicle 15 includes a torque controller 35 which is connected to each of the braking system 28, the engine controller 24 and a transmission controller 25 as hereinafter described.

Figure 3:
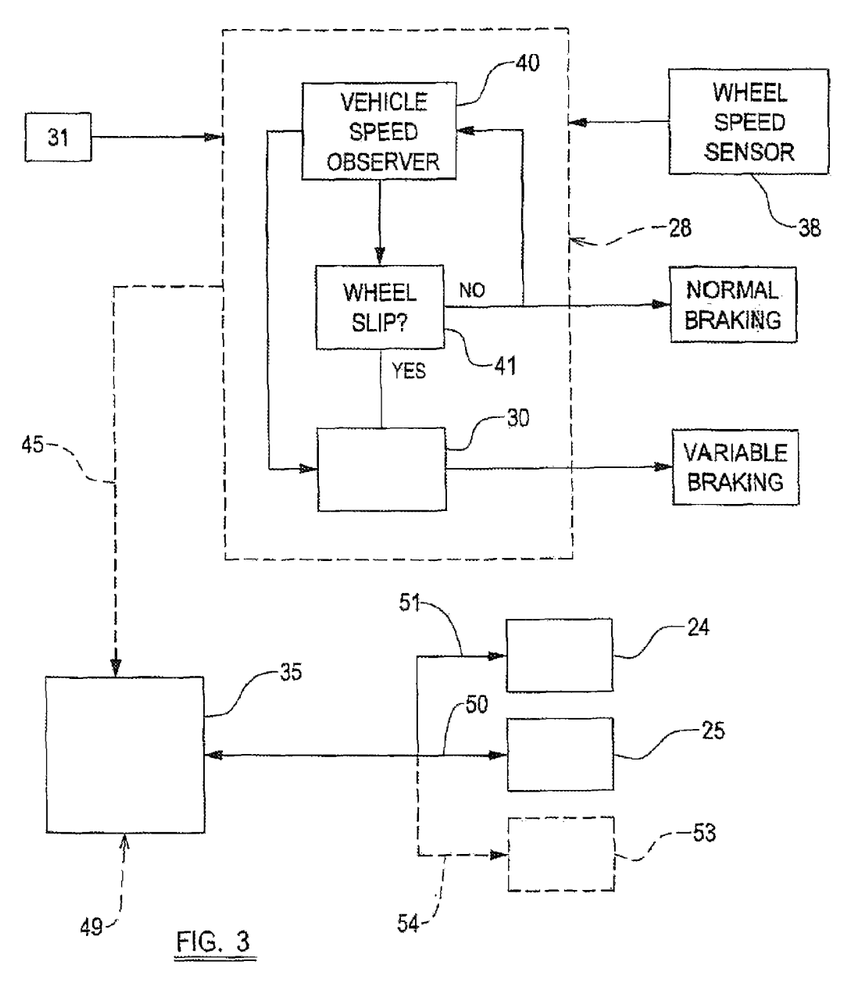
FIG. 3 is a diagrammatic illustration of the control system of the vehicle of FIG. 2.

Referring to FIG. 3, the braking system 28 has inputs from not only the brake control 31, but from wheel speed sensors 38 too. Each vehicle wheel 16-19 preferably has its own speed sensor, for example, typically provided by a toothed element which rotates with the wheel 16-19, with there being an inductive speed pick up or other sensor, or alternatively an optical scanner which counts the teeth as they pass. Any other kind of wheel speed sensor could be provided.

In another example, only the front wheel 16, 18 or only the rear wheels 17, 19 may have wheel speed sensors.

In each case, the wheel speed sensors 38 sense the rotational speed of their respective wheels 16-19 which may be converted into an angular velocity in the sensor, or in the braking system 28 at large.

An ABS controller 30 is shown included within the braking system 28, and in the event that the braking system 28 determines that any wheel 16-19 is slipping or is about to slip relative to the ground, the ABS controller 30 varies the braking force applied to the respective wheel 16-19, between, in alternative periods, an applied state in which the braking force is applied, and a released state in which the braking force is released. Otherwise the braking system 28 applies a constant braking force to all the wheels, depending on the input from the foot pedal 31.

In one example, the ABS may be proportional in that when the braking force is applied, the braking force is held for an "on" period before being released, or the braking force may be released almost immediately after application.

To achieve safe braking, when the brakes are applied, a vehicle speed observer 40 of the braking system 28 determines the vehicle speed from the wheel speed sensor 38 input, and in the event that it is determined that a wheel is or is about to slip, thus provides an input indicative of vehicle speed, to the ABS controller 30 as indicated by the logic box 41 in FIG. 3. The vehicle speed observer 40, by making comparisons between the sensed speeds of each of the wheels 16-19 or pairs of wheels 16-19, is able to determine whether a wheel or wheels 16-19 is or is about to slip relative to the ground. In the event that no slippage or potential slippage is determined, the brakes will be applied to arrest the vehicle speed, conventionally with a braking force being continually applied. However, in the event that it is determined that a wheel is or may be about to slip, the ABS controller 30 applies a variable braking force to that wheel 16-19.

The magnitude of the braking force during the periods in which the variable braking force is applied, and the relative durations of the alternate applied and non-applied braking force periods, is determined by the ABS controller 30 to arrest the vehicle speed whilst maintaining steering ability, within a predetermined period. Whilst the variable braking force is being applied, the ABS controller 30 determines the vehicle speed from the wheel speed sensors 38 and continues to apply the variable braking force until either the vehicle speed is determined to be zero, or wheel slippage is no longer occurring, or the operator ceases braking.

It will be understood that the angular velocity of the wheels 16-19, at least during the periods in which the variable braking force is released, ought to equate to the actual vehicle speed. However as explained above, in the event that the wheels 16-19 are large and heavy and thus possess substantial inertia, and particularly in the case of a low coefficient of friction between the wheel 16-19 and the ground, a wheel 16-19 to which a variable braking force is applied by the ABS controller 30 may not accelerate sufficiently in periods when the braking force is released by the ABS to bring its angular velocity close to the vehicle speed.

Figure 4:
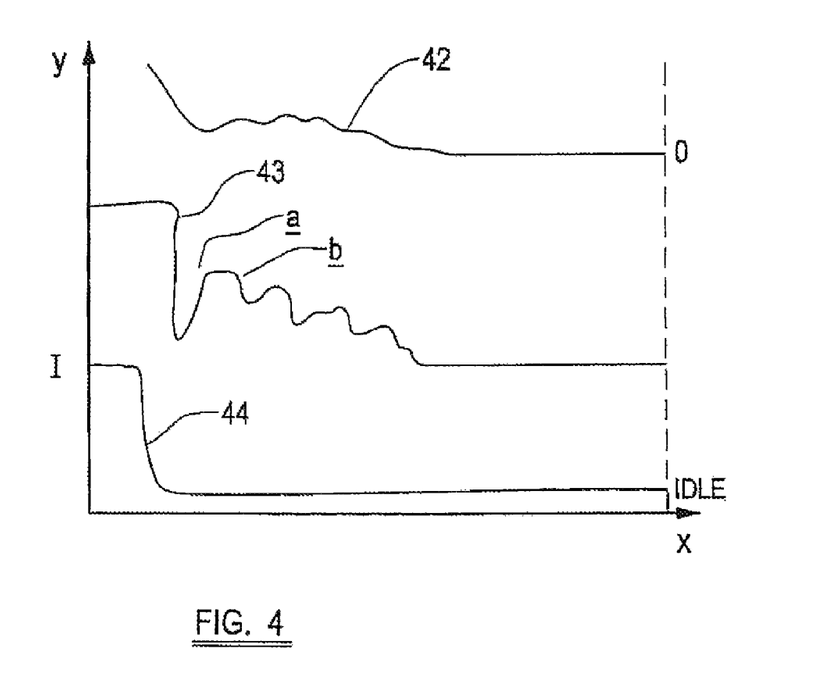
FIG. 4 is a graph showing the vehicle deceleration expected by the ABS, the actual wheel speed and engine speed without the method of the present invention being performed.

The effect of this is illustrated in FIG. 1 as described above, and also in FIG. 4. In FIG. 4, there is a graph which illustrates at the plot indicated at 42, the reference signal indicative of the estimated vehicle deceleration determined by the ABS controller 30. The y-axis of the graph of FIG. 4 thus plots vehicle speed against time.

Plot 43 indicates the actual sensed wheel speed for a wheel 16-19 to which a variable braking force is being applied by the ABS controller 30, the y-axis indicating the sensed wheel speed.

The plot at 44 indicates the engine speed, which rapidly decreases from an engine speed I when the operator removes his foot from the vehicle accelerator to place his foot on the brake control 31. Thus for all the plots, the x-axis plots time.

To avoid the possibility of the wheel 16-19 to which the variable braking force is applied becoming locked before the vehicle speed has been arrested, at least during the periods in which the braking force is released, a torque is applied to the wheel 16-19 to assist the wheel accelerating to bring its angular velocity at least close to the actual vehicle ground speed.

Referring again to FIG. 3, in the event of variable braking force being applied to any wheel 16-19, an output from the braking system 28 is fed along line 45 and input to the torque controller 35. The output from the braking system 28 includes information and data relating to the sensed wheel speed from the wheel speed sensors 38, and may include the reference signal 42 (see FIG. 4) giving the vehicle speed determined by the ABS controller 30, and which may be lower than the true vehicle speed. However, if desired the torque controller 35 may make its own assessment of vehicle speed.

In each case, the torque controller 35, using an algorithm, compares the sensed wheel speed and the assessed vehicle speed 42 in order to establish if it is likely that the wheel 16-19 is, during the periods in which the braking force is released, accelerating to bring its angular velocity towards the vehicle speed relative to the ground.

In FIG. 4, it can be seen that immediately the braking force is applied, at section a of the plot 43, the wheel speed will decrease significantly, but that when the braking force is next applied, at section b of plot 43, the wheel speed has not increased to a speed corresponding to that expected for the steady vehicle deceleration indicated by the plot 42 over the corresponding time period. In other words, the shape of the plot 43 over the sections a and b would appear to indicate that the there is wheel slippage relative to the ground during the variable braking force periods when the braking force is not being applied.

To compensate, the torque controller 35 operates to apply some torque to the relevant wheel 16-19 at least during periods in which the braking force is released.

This may be achieved in different ways.

In the example particularly described, the transmission 22 is a CVT. Ordinarily with the CVT transmission 22 operating in automatic mode, when the operator removes his foot from the accelerator pedal, the engine 20 speed decreases as indicated by the plot 44 on the FIG. 4 graph towards an idle speed. Also, the transmission controller 25 would respond by reducing the transmission ratio, as the engine 20 speed reduces.

In accordance with the invention, the torque controller 35 acts both to prevent the transmission controller 25 reducing the transmission ratio at least towards or to zero, and preferably below a predetermined transmission ratio, and to maintain a minimum engine 20 speed, preferably controlling the rate of engine speed decrease, at least during the variable braking force periods in which the braking force is released by the ABS controller 30.

This is achieved by the torque controller 35 sending a signal along line 50 to the transmission controller 25. Simultaneously, the torque controller 35 sends a signal along a line 51 to the engine controller 24, to control the rate at which the engine 20 speed will reduce towards an idling speed, or if the engine 20 is revving at below a predetermined minimum speed, to cause the engine speed to accelerate to a minimum speed. Each of the engine speed controller 24 and transmission controller 25 may provide inputs to the torque controller 35 indicative of the state of the engine 20 and transmission 22, which inputs may be used by the torque controller 35 carefully to control the torque applied to the wheel in accordance with the torque controller's 35 own algorithm.

The torque controller 35 may be arranged to act to ensure that torque is applied to the slipping or potentially slipping wheel only during the periods in which the ABS controller 30 releases the braking force.

Practically though, where the torque controller 35 is unable to process data fast enough, or data is not supplied fast enough, it may not be possible to ensure that torque is applied strictly only during the periods in which the braking force is released by the ABS. Accordingly in one proposal, an average torque is applied to the wheel during the entire time that the ABS controller 30 is applying, holding and releasing the braking force. The torque applied, although adequate to accelerate the wheel when the braking force is released, is not sufficient significantly detrimentally to effect braking when the braking force is applied and held.

In one example, the transmission 22 may include a clutch 53 to which a signal may sent from the torque controller 35 along a line 54 to engage and disengage the clutch 53 and hence torque transmissed to a slipping wheel 16-19, in concert with the ABS controller 30 releasing and applying and holding the braking force. However in another example, the torque controller 35 may apply the torque only during the periods in which the ABS releases the braking force, by increasing the transmission ratio of the CVT 22 from zero during these periods, e.g. through hydrostatic pressure increase where the CVT variater is a hydraulic motor, where the CVT 22 is able to respond quickly enough to signals from the torque controller 35.

Where the transmission 22 is not a CVT, the torque controller 35 may only operate a clutch 53 in order to achieve the application of torque to the braked wheel at least when the braking force is released by the ABS, but preferably simultaneously with controlling the engine 20 speed to ensure that the engine 20 is revving at a speed adequate for torque to be made available for application to the wheel. Where the transmission is a CVT the transmission ratio may be reduced during periods in which braking is applied, by e.g. hydrostatic pressure reduction where the variater is a hydraulic motor, from an otherwise higher level.

In each case, the torque controller 35 will operate according to an algorithm which establishes the circumstances under which torque is applied to a braked wheel, and the amount of torque to be applied from the engine 20, by controlling one or both of the engine 20 speed and transmission 22 ratio and/or clutch 53, depending on the reference 42 or other vehicle speed estimation, and wheel speed signals received from the braking system 28, and inputs from the engine speed controller 24 and transmission controller 25.

It will be appreciated that although using the ABS to obtain data for its operation, the torque controller 35 of the invention does not interfere with the normal operation of the braking system 28, but is an enhancement which enables ABS to be used more effectively on a vehicle with high inertia wheels, on low friction ground surfaces.

Figure 5:
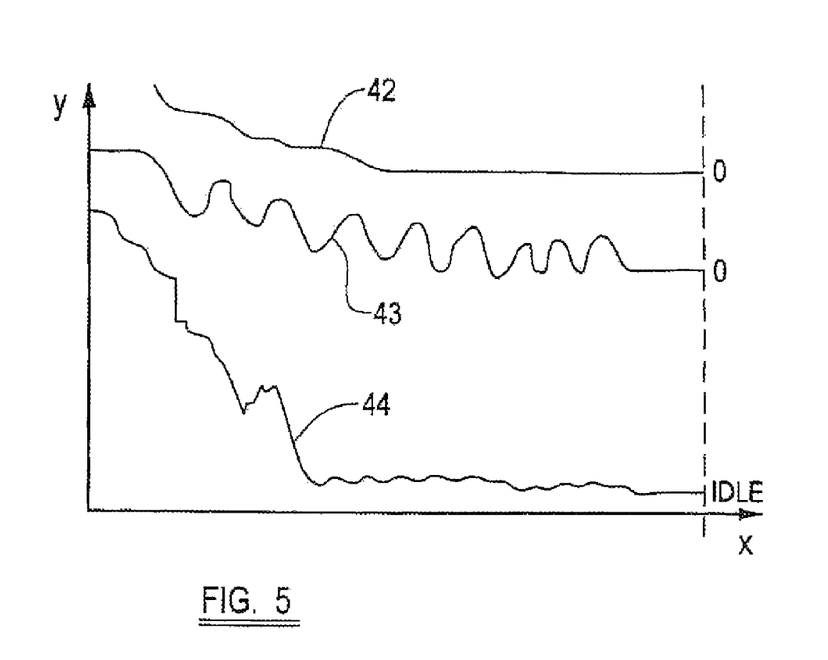
FIG. 5 is a graph similar to FIG. 4, when the method of the invention is performed.

In FIG. 5, the graph indicates the effect of performing the present invention. The curve 42 again is a reference signal indicative of the rate of vehicle deceleration determined by the ABS as the ABS controller 30 applies the variable braking force to the wheel 16-19. The curve 43 indicates that by applying torque to the wheel during the periods in which the braking force is released, the wheel accelerates during those periods in line with the vehicle deceleration shown by the curve 42. Thus the braking system 28 is not misled into incorrectly determining the vehicle speed by merely using the signals from the wheel speed sensor 38. FIG. 5 also shows at curve 44, the controlled rate of decrease of engine speed achieved by the torque controller 35 for a CVT transmission 22.

Various modifications may be made without departing from the scope of the invention.

If desired, the torque controller 35 may be provided with data indicative of vehicle speed from a source independent of the ABS braking system 28. For example, the torque controller 35 may receive an input from one or more accelerometers 49, thus to improve the torque controller's 35 ability to assess when the sensed wheel speed and vehicle speed indicate slippage of the wheel when the ABS is operative, during the periods when the braking force is released, is occurring.

In a vehicle without a CVT 22, the torque controller 35 may only control the engine 20 speed and a clutch 53 to enable torque to be applied.

If desired, although preferably the braking system 28 and especially the ABS controller 30 and torque converter 35 are operationally separate, if desired a single controller may be combined at least in hardware terms, to reduce components and system complexity.

The various components of the control system described i.e. including the ABS braking system 28, the torque controller 35, wheel sensors 38, engine controller 24 and transmission controller 25 where provided, and clutch 53 where provided, may be connected via a CAN bus, but may otherwise be connected, for example by means including wireless connections, as desired.

Although the invention has particularly been described in relation to a vehicle such as a tractor or working machine, the invention may be applied to other vehicles where there may be a problem with wheel slippage in periods in which the ABS releases the braking force, due to high wheel inertia and low coefficient of friction between the wheel and the ground, or any other reason.

The invention claimed is:

1. A method of braking a vehicle which includes ground engaging wheels, a torque controller, and a braking system with an anti-lock braking system (ABS) capability and including an operator actuated brake control, said method comprising the steps of:
    operating the ABS in response to an operator engaging the brake control,
    sensing slippage or impending slippage of at least one of the ground engaging wheels relative to the ground while the brake control is engaged and vehicle speed is decreasing during operation of the ABS,
    while the brake control is engaged and vehicle speed is decreasing during operation of the ABS, varying braking force applied to the at least one of the ground engaging wheels between, in alternating periods, an applied state in which the braking force is applied, and a released state in which the braking force is released, and
    when slippage or impending slippage of at least one of the ground engaging wheels is sensed, operating the torque controller to apply torque while the brake control is engaged and vehicle speed is decreasing during operation of the ABS to the at least one ground engaging wheel undergoing slippage or impending slippage to assist acceleration of the at least one ground engaging wheel, wherein the torque is applied during the released state periods in which the braking force is released by the ABS.

2. A method according to claim 1 wherein the torque which is applied is derived from a prime mover.

3. A method according to claim 2 wherein the prime mover is an engine which in normal use acts to drive the wheels to provide the vehicle with forward or reverse motion.

4. A method according to claim 3 wherein the method includes, at least during those periods when the braking force is released and torque is applied to the at least one ground engaging wheel to accelerate the wheel, maintaining a minimum engine speed.

5. A method according to claim 4 wherein the method includes providing a signal to an engine controller during braking, at least when the ABS is operated and it is desired to provide torque to the at least one ground engaging wheel, to maintain the engine speed at a minimum speed.

6. A method according to claim 5 wherein the engine controller responds to the signal by accelerating the engine speed up to a minimum speed when the engine speed is below the minimum speed.

7. A method according to claim 3 wherein the vehicle has a continuously variable transmission (CVT) to transmit power from the prime mover, to drive the at least one ground engaging wheel of the vehicle.

8. A method according to claim 7 wherein during the periods in which the braking force is released by the ABS and torque is applied to accelerate the at least one ground engaging wheel, a signal is sent to a CVT controller, to require the CVT to select a transmission ratio appropriate for applying the required torque to the at least one ground engaging wheel.

9. A method according to claim 7 wherein the CVT is controllable to reduce the transmission ratio to or towards zero during the periods while the braking force is applied.

10. A method according to claim 9 wherein the transmission includes a variater which is a hydraulic motor and the transmission ratio is varied during the periods while the braking force is applied by increasing hydrostatic pressure.

11. A method according to claim 7 wherein the transmission isolates the prime mover from the at least one ground engaging wheel by disengagement of a clutch during the periods while the braking force is applied.

12. A method according to claim 1 wherein the method includes determining any discrepancy between sensed angular velocity of the at least one ground engaging wheel, and the vehicle speed determined by the ABS, and applying torque to the at least one ground engaging wheel at least during periods in which the braking force is released, where any discrepancy is determined to be sufficiently great to indicate that the at least one ground engaging wheel is not accelerating to bring its angular velocity sufficiently towards the actual vehicle speed during those periods.

13. A method according to claim 12 wherein such discrepancy is determined by the torque controller which analyzes the actual wheel speed sensed, and compares it to a reference signal provided by the ABS which is indicative of vehicle deceleration determined by the ABS.

14. A method according to claim 13 wherein an auxiliary sensor provides an input to the torque controller indicative of vehicle speed relative to the ground, independent of any wheel speed sensor, to enable the torque controller more accurately to determine any error between the vehicle speed determined by the ABS and actual vehicle speed relative to the ground.

15. A method according to claim 14 wherein the sensor is an accelerometer.

16. A vehicle comprising ground engaging wheels, a torque controller, and a braking system having an operator actuated brake control and an anti-lock braking system (ABS) capability,
    wherein the ABS becomes operative in response to an operator engaging the brake control,
    wherein, while the brake control is engaged and vehicle speed is decreasing during operation of the ABS, the braking system is able to sense slippage or impending slippage of at least one of the ground engaging wheels relative to the ground, and is able to vary the braking force applied to the at least one of the ground engaging wheels between, in alternating periods, an applied state in which the braking force is applied, and a released state in which the braking force is released, and
    wherein said torque controller is able to apply torque while the brake control is engaged and vehicle speed is decreasing during operation of the ABS to the at least one ground engaging wheel undergoing slippage or impending slippage to assist acceleration of the at least one ground engaging wheel during the released state periods in which the braking force is released by the ABS.

17. The vehicle of claim 16 further comprising a continuously variable transmission (CVT) to transmit power from a prime mover to drive the at least one ground engaging wheel, wherein during periods in which the braking force is released by the ABS and torque is applied to accelerate the at least one ground engaging wheel, a signal is sent to the CVT controller to require the CVT to select a transmission ratio appropriate for applying the required torque to the at least one ground engaging wheel.

18. The vehicle of claim 16 wherein the torque controller is able to determine any discrepancy between angular velocity of the at least one ground engaging wheel and vehicle speed determined by the ABS, and apply torque to the at least one ground engaging wheel to bring its angular velocity sufficiently towards the actual vehicle speed.

19. The vehicle of claim 18 further comprising an auxiliary sensor able to provide an input to the torque controller indicative of vehicle speed relative to the ground.

20. A method of braking a vehicle comprising the steps of providing a vehicle comprising ground engaging wheels, a torque controller, and a braking system having an operator actuated brake control and an anti-lock braking system (ABS) capability, wherein the ABS becomes operative in response to an operator engaging the brake control; and wherein, while the brake control is engaged and vehicle speed is decreasing during operation of the ABS, the braking system:
  a) senses the slippage or impending slippage of at least one of the ground engaging wheels relative to the ground;
  b) varies the braking force applied to the at least one of the ground engaging wheels between an applied state in which the braking force is applied, and a released state in which the braking force is released; and
  c) when slippage or impending slippage of at least one of the ground engaging wheels is sensed during operation of the ABS, operates the torque controller so that the torque controller applies torque to the at least one ground engaging wheel undergoing slippage or impending slippage to assist acceleration of the at least one ground engaging wheel, wherein the torque is applied during the released state periods in which the braking force is released by the ABS.

* * * * *